3,058,935
PHOSPHORUS-CONTAINING POLYESTERS AND PROCESS FOR THEIR MANUFACTURE

Werner Starck, Hofheim (Taunus), Fritz Rochlitz, Frankfurt am Main, and Herbert Vilcsek and Jakob Winter, Hofheim (Taunus), Germany, assignors to Farbwerke Hoechst Aktiengesellschaft vormals Meister Lucius & Brüning, Frankfurt am Main, Germany, a corporation of Germany
No Drawing. Filed July 15, 1958, Ser. No. 748,582
Claims priority, application Germany July 19, 1957
11 Claims. (Cl. 260—22)

The present invention relates to novel phosphorus-containing polyesters and to a process for their manufacture, it relates furthermore to the application of said novel polyesters.

It is well known to prepare polyesters from alcohols and carboxylic acids. Moreover it is known to produce polyesters in which the carboxylic radicals are wholly or partially replaced by phosphonic acid, phosphoric acid or phosphorous acid derivatives.

Depending on their phosphorus content the condensation resins of this kind are more or less difficult to inflame or are self-extinguishing after having been removed from the flame.

Now we have found, and this being surprising, that novel phosphorus-containing polyesters having excellent properties can be produced by reacting as phosphorus component those derivatives of organic phosphonous acids which are capable of reacting with hydroxyl groups, preferably the dihalides or esters thereof having the following constitution

with hydroxyl groups containing carboxylic acid polyesters and/or polyhydric saturated or unsaturated alcohols or mixtures of mono- and polyhydric saturated alcohols with saturated or unsaturated aliphatic and/or cycloaliphatic and/or aromatic polybasic carboxylic acid derivatives or carboxylic acids or mixtures of mono- and polybasic carboxylic acid derivatives in which R stands for an aliphatic, cycloaliphatic or aromatic, if desired substituted hydrocarbon radical, X represents chlorine or bromine, preferably chlorine, or alkyl radicals having 1–8 carbon atoms, cycloakyl or aryl radicals bound to the phosphorus by way of an oxygen atom.

As organic radical R in the above formula there may be considered, for example, saturated and unsaturated aliphatic radicals or 2–12 or more carbon atoms such as ethyl, propyl, butyl, isobutyl, amyl, hexyl, octyl, decyl, dodecyl, isoctenyl; cycloaliphatic radicals such as cyclohexyl or decahydronaphthyl; aromatic radicals such as phenyl or naphthyl; mixed aliphatic/aromatic radicals such as toluyl, benzyl, styryl and the substitution products of the series mentioned, for example halogen-alkyls such as trichloromethyl; furthermore, for example, chlorocyclohexyl or chlorophenyl.

As compared with known phosphorus-containing polyesters prepared with phosphoric or phosphorous acid derivates the resins produced by the process of the invention exhibit the advantage that they are considerably more stable to hydrolysis due to the P-C linkage. As compared with the resins in which the phosphorus is incorporated as phosphonate radical by condensation the advantage consists in the fact that the aromatic phosphonous derivatives are more readily accessible than the corresponding phosphonic derivates.

The phosphorus-containing polyesters obtained by the process of the invention are viscous, in most cases only slightly colored or colorless and transparent products of high molecular weight which are very stable. When correspondingly selecting the components and the proportions thereof there may be produced products having the most varying properties. In general the products prepared by the process of the invention are—according to the phosphorus content—more or less difficult to inflame and possess self-extinguishing properties. When using the dihalides of aromatic phosphonous acids there are obtained resins which, according to the manufacturing conditions, contain larger or smaller amounts of chemically bound chlorine, which, in addition to the phosphorus content, may contribute to render the products flame-resistant.

The phosphorus-containing polyesters according to the invention can be prepared in different ways. There may be first prepared in known manner a polyester containing hydroxyl groups which is then reacted in a second stage with a derivative of a phosphonous acid.

It is furthermore possible to react the corresponding derivative of a phosphonous acid in a first stage with an excess of a polyhydric alcohol or a mixture of mono- or polyhydric alcohols and the reaction products are then reacted in a second stage with the corresponding amount of a polybasic carboxylic acid or mixtures of such carboxylic acids or mixtures of mono- and polybasic carboxylic acids. Instead of the free carboxylic acids there may be likewise used the derivatives thereof, such as esters, anhydrides or halides.

Moreover there can be reacted in one stage the derivatives of polyvalent, saturated and/or unsaturated carboxylic acids or mixtures of derivatives of mono- or polyvalent saturated or unsaturated carboxylic acids with derivatives of organic phosphonous acids in the presence of the corresponding polyhydric alcohols, or mixtures of mono- and polyhydric alcohols. In case the dihalides of organic phosphonous acids are used the hydrogen halide set free in the course of the reaction may simultaneously act as catalyst.

The esterification with the dihalides of organic phosphonous acids is carried out in general in a manner such that the dihalide of the organic phosphonous acid is slowly introduced into a polyhydric alcohol or a mixture of polyhydric alcohols or a hydroxyl groups-containing polyester or a mixture of mono- and polyhydric alcohols at a temperature in the range between 0 and 120° C. and preferably between 30 and 60° C. Depending on the viscosity of the alcohol, alcohol mixture or hydroxyl groups-containing polyester used it may be necessary to operate in the presence of a solvent. There may be particularly used hydrocarbons, such as hexane, cyclohexane, petroleum fractions, benzene, xylene, toluene; or cyclic ethers such as dioxane or tetrahydrofurane; or other inert solvents for example chlorobenzene.

The hydrogen halide set free in the reaction can be eliminated, for example, by reducing the pressure, by an inert gas current or, if desired, by the use of suitable hydrogen halide acceptors, such as tertiary bases, for example triethyl amine, dimethyl aniline and the like, or simply by heating the reaction mixture. In order to eliminate the hydrogen halide it is likewise possible to apply simultaneously several of the steps mentioned above. It is particularly easy to remove the hydrogen halide under reduced pressure while simultaneously increasing the temperatue, for example under a pressure in the range between 100 and 30 mm. of mercury and at a temperature ranging between 100 and 180°; other conditions being likewise suitable. It is not advisable, however, to increase the temperature to more than 200° C. since in this case colorations may occur. When operating as described above the content of hydrogen halide in the reaction mixture can be reduced to less than 0.2%.

It is particularly interesting that it is easy, for example to produce completely odorless, phosphorus-containing polyesters in the manner described above with the use of phenyl phosphonous dichloride. This is all the more remarkable since already small amounts of phenyl phosphonous dichloride and low molecular esters of phenyl phosphonous acid possess a disagreeable and disgusting odor and even high molecular compounds obtainable from phenyl phosphonous dichloride and components different from those described above could never be prepared up to now being free from odor.

The reesterification with the use of esters of organic phosphonous acids is brought about according to known methods applied to the manufacture of carboxylic acid polyesters preferably in the presence of acid or basic catalysts.

For the manufacture of the phosphorus-containing polyesters according to the invention there may be used as polybasic carboxylic acids in principle all those which contain at least one carbon atom between the carboxylic groups. In addition to polybasic carboxylic acids there may also be used monocarboxylic acid. All carboxylic acids to be considered can likewise be used in the form of their derivatives, such as esters anhydrides or halides as far as they are known. There can be employed, for example, malonic acid, succinic acid, chlorosuccinic acid, adipic acid, sebacic acid, phthalic acid, isophthalic acid, terephthalic acid, tetrachloro-phthalic acid, hexachlorendomethylene-tetrahydrophthalic acid, maleic acid, fumaric acid, itaconic acid, mesaconic acid, citraconic acid, malic acid, tartaric acid, trimesic acid, tricarballylic acid, aconitic acid, citric acid, hemimellitic acid, pyromellitic acid etc. In addition to the aforesaid polyvalent carboxylic acids there may be used the following monocarboxylic acids, i.e. generally saturated or unsaturated aliphatic (having at least 2 carbon atoms) or cycloaliphatic, aromatic or heterocyclic carboxylic acids or hydroxy acids, or halogen substituted carboxylic acids, such as acetic acid, propionic acid, butyric acid, crotonic acid, sorbic acid, benzoic acid, chlorobenzoic acid, furancarboxylic acid, cinnamic acid, methylacrylic acid, acrylic acid, nicotinic acid, lactic acid, hydroxy-butyric acid, chloroacetic acid, stearic acid, oleic acid, fatty acids of linseed oil, ricinic acid or ricinoleic acid.

The number of the suitable polyhydric alcohols is, of course, very large. There are mentioned, for example, ethylene glycol, polyethylene glycols, propylene glycol, butylene glycol, hexane-diol, butene-diol, mono- and polycyclic alcohols such as tricyclo-decane-di- or trimethylol, glycerol, hexane-triol, pentaerythrite, dipentaerythrite, sorbitol, 1,2-diphenyl-ethylene glycol, phthalyl alcohol, partial alkyl ethers of the aforesaid tri- or polyhydric alcohols still containing at least two free OH groups etc.

Particularly suitable are polyhydric alcohols having between the hydroxyl groups at most 3 carbon atoms. It is of advantage in many cases to replace part of the polyhydric alcohols by saturated or unsaturated other alcohols or to combine at least trihydric alcohols with monohydric alcohols, halogen-containing derivatives being likewise included.

As monohydric alcohols there are suitable, for example, methyl, ethyl, propyl, butyl, propargyl alcohol etc., benzyl alcohol, ethyl hexanol, allyl alcohol, oleyl alcohol, chloroethanol, tricyclo-decane-monomethylol. The amounts of monohydric alcohols used depend largely on the at least trihydric alcohols used.

In order to produce useful products the number of hydroxyl groups in the monohydric alcohols should not exceed one-third of the total number of the alcoholic hydroxyl groups to be condensed.

As starting materials for the manufacture of the novel phosphorus-containing polyesters according to the invention there can consequently be used a large number of very different alcohols, carboxylic acids and derivatives of organic phosphonous acids and it is, therefore, possible to produce a very large number of novel types of condensation resins. The number of the obtainable resins is furthermore increased by the fact that several different alcohols, carboxylic acids and organic phosphonous acids can be employed simultaneously for the manufacture of one resin, whereby resins having the most different properties are obtained. For certain applications, for example for the manufacture of baking lacquers, it has proved to be especially suitable to use ethylene glycol in addition to glycerol, and maleic acid and fatty acid of linseed oil in addition to terephthalic acid.

Further variants of the manufacture of phosphorus-containing polyesters according to the invention with derivatives of organic phosphorus-containing acids consist in the fact that in addition to hydroxyl groups-containing polyesters there may advantageously be used other alcohols which have not been employed for the preparation of the polyester.

The solubility of the novel resins can be largely modified by the selection of the starting compounds. Thus there are obtained with the use of at least trihydric alcohols resins which are cross-linked and, therefore, difficultly soluble; by an addition of monohydric alcohols the cross-linking can be counteracted so that the solubility is substantially retained.

The portion of phosphonite radicals in the resins according to the invention can be varied within wide limits. It is of advantage to choose the molar ratio of the phosphonous acids to the sum of the carboxylic acids between 1:10 and 10:1 and preferably between 1:9 and 1:4. There is no lower limit for the portion of phosphonous acids, but the upper limit of 90%, calculated on the number of esterifiable hydroxyl groups present shall not be exceeded. In order to produce substances having self-extinguishing properties the content of phosphorus must amount to at least 1% by weight calculated on the final resin, corresponding for example to 4.6% by weight of phenyl phosphonous acid.

If the products prepared according to the invention additionally contain double bonds as is the case, for example, when maleic or fumaric acid or other unsaturated compounds are used, it is possible further to vary the properties of said products by a subsequent polymerization. Said polymerization is carried out, for example, in the presence of known polymerization catalysts such as peroxides, for example benzoyl peroxide, lauroyl peroxide etc. Thus there are obtained soft or hard, incombustible or self-extinguishing polymers.

Thermo-hardenable resins can be produced when the polyesters have been prepared preponderantly from tri- or polyhydric alcohols.

It is furthermore possible to increase the molecular weight of the polyesters containing unsaturated groups and being prepared according to the invention by dissolving them in polymerizable low molecular compounds and effecting copolymerization under known conditions. It is of advantage to mix the unsaturated monomers with the said unsaturated phosphorus-containing polyesters in a ratio such that the portion of unsaturated monomer amounts to about 10 to 60%, preferably 20–40% of the total amount of the mixture. The copolymers obtainable in this manner are distinguished by a great hardness and stability, they have self-extinguishing properties, are transparent, slightly colored or colorless.

The copolymerization of unsaturated phosphorus-containing polyesters prepared by the process of the invention with low molecular polymerizable compounds is brought about by irradiation and/or heating and/or addition of catalysts at normal or raised temperature. As catalysts there come into consideration, for example, peroxides, such as benzoyl peroxide, tert. butyl hydroperoxide, cumene hydroperoxide, tolyl peroxide, di-tert-butyl peroxide, chlorobenzoyl peroxide, lauroyl peroxide, furthermore azo-diisoacylnitriles such as azo-diisobutyronitrile; or sulfinic acids such as p-methoxy-sulfinic acid, dodecyl-sulfinic acid, cyclohexyl-sulfinic acid, benzene-sulfinic acid, p-toluene-sulfinic acid or sulfoneamines such as N-bis-(p-tolylsulfon-methyl)-methylamine, N-p-tolylsulfon-methyl-2-hydroxyethylamine, p-tolylsulfoncarbinol, phenylsulfoncarbinol, p-tolyl-sulfon-propylcarbinol, p-chlorophenyl-carbinol.

Monomers that are suitable for being copolymerized with the unsaturated polyesters prepared by the process of the invention are, for example, styrene, styrenes alkylated in the nucleus and/or in the side chain, vinyl esters such as vinyl acetate, acrylic acid, and methyacrylic acid and the esters and nitriles thereof, allyl and methallyl esters of saturated or unsaturated mono- and polycarboxylic acids, allyl and methallyl phosphates and phosphonates, esters of vinyl phosphonic acid, triallyl-cyanurate, triallyl-trimesinate, low molecular unsaturated polyesters, particularly those containing allyl or methallyl groups.

The phosphorus-containing polyesters prepared by the process of the invention are high molecular products which are well soluble in a number of organic solvents as far as they are not cross-linked by condensation, polymerization or copolymerization. The cross-linked products are substantially insoluble masses being at most capable of swelling in organic solvents.

Especially important are the self-extinguishing properties or the incombustibility of the products according to the invention due to their content of phosphorus. The self-extinguishing properties or incombustibility are distinctly evident even when only relatively small amounts of phosphorus have been incorporated with the aid of derivatives of organic phosphonous acids.

The products of the invention are suitable as flame-proofing additions to various substances, for the impregnation of paper, textile materials, glass fibres and the like, as adhesives and lacquers, as coating compositions, as protective coatings against corrosion, as stabilizers for polyvinyl chloride, as intermediate products and starting materials for the manufacture of plastics and particularly in combination with suitable unsaturated monomers for the manufacture of self-extinguishing shaped bodies with or without embedded filler. By suitably selecting the components lacquer resins can be obtained which, after having been baked, yield excellent fireproof and firmly adhering films. It is furthermore interesting that the resins of the invention are generally colorless or at most slightly colored. They have an excellent transparency and are therefore, suitable for the manufacture of transparent shaped bodies with definite optical properties.

An advantageous process for the manufacture of the polyesters according to the invention which, as shown in the examples, can be varied within wide limits, consists in preparing in known manner a hydroxyl groups-containing polyester for example from 1 part by weight of phthalic anhydride, 1–1.5 parts by weight of ethylene glycol and 0.61–1.2 part by weight of maleic anhydride, which polyester is then reacted at a temperature in the range between 50 and 180° C. with about 0.2–0.8 part by weight of an organic phosphonous acid derivative, for example phenylphosphonous dichloride. The hydrogen chloride formed is eliminated under reduced pressure.

The colorless resin thus obtained can be subsequently polymerized at a temperature in the range between 50 and 120° C. in the presence of 0.1 to 1% of dibenzoyl peroxide. It is likewise possible to admix the resin with 0.1 to 1.5 parts by weight of styrene or another monomer and to produce a copolymer under the same conditions.

The following examples serve to illustrate the invention, but they are not intended to limit it thereto; the parts being by weight unless otherwise stated.

*Example 1*

720 parts of diethylene glycol are introduced into a four-necked flask provided with stirring device, water separator with mounted reflux condenser and gas inlet tube, dropping funnel and thermometer. 1200 parts of phenylphosphonous dichloride are then added slowly at a temperature of 50 to 70° C. by means of the dropping funnel while stirring continuously. The temperature is then gradually increased to 160° C. and the pressure is reduced until the hydrogen chloride is completely eliminated, this being tested with silver nitrate in an aqueous solution or suspension of a sample of the reaction mixture in nitric acid solution.

After having cooled to about 80° C. the reaction mixture is admixed in the same flask with 700 parts of diethylene glycol, 660 parts of maleic anhydride and 100 parts of xylene and the whole is reacted at a temperature in the range from 140 to 170° C., the xylene serving as water entrainer. In addition to an esterification a reesterification takes place simultaneously. A high molecular, nearly colorless and difficultly inflammable product is obtained which is insoluble in water and well soluble in organic solvents.

*Example 2*

259 parts of phthalic anhydride and 155 parts of ethylene glycol are reacted in the presence of 100 parts of xylene as water entrainer in the apparatus described in Example 1. The reaction being terminated 135 parts of phenylphosphonous dichloride are added slowly by means of the dropping funnel to the carboxylic acid polyester containing hydroxyl groups so that the temperature does not exceed 70° C. The whole is then heated for 1 hour to 100° C. and subsequently for 30 minutes to 150° C. Traces of hydrogen chloride still present are eliminated under reduced pressure by heating the mixture to 170° C. After having cooled a viscous and nearly colorless resin is obtained which does no longer flow and which is well soluble in organic solvents.

*Example 3*

279 parts of ethylene glycol, 177 parts of maleic anhydride and 299 parts of phthalic anhydride are mixed in the apparatus described in Example 1 and heated to 50° C. while stirring. 120 parts of phenylphosphonous dichloride are then dropped in slowly at a temperature of 50–70° C. The addition of phenylphosphonous dichloride being terminated the mixture is stirred for another hour at 100° C. and then esterified in the presence of 80 parts of xylene at a temperature in the range from 140 to 170° C.

After having distilled off the xylene and cooled, a viscous resin is obtained which is insoluble in water and well soluble in organic solvents.

10 parts of the resin thus obtained are mixed at 65° C. with 0.25 part of benzoyl peroxide and polymerized at 100° C. A hard, transparent and difficultly inflammable mass is obtained.

*Example 4*

In an esterification apparatus there are added at 60° C. within 35 minutes while stirring, 45 parts of phenylphosphonous dichloride to 155 parts of ethylene glycol. During the reaction heat is evolved so that cooling is necessary. The whole is maintained at 60° C. for one hour, while stirring, and then slowly heated first to 100° C. and after 30 minutes to 120° C. while the pressure is reduced simultaneously in order to eliminate the residual hydrogen chloride. The mixture is then cooled to 80° C. and 185 parts of phthalic and maleic anhydride are added. Esterification is brought about at 140–180° C. in the presence of 80 parts of xylene as water entrainer. The reaction being terminated the xylene is removed under reduced pressure and a clear and colorless resin is obtained which does no longer flow and which is well soluble in organic solvents.

*Example 5*

179 parts of phenylphosphonous dichloride are reacted as described in Example 4 with 372 parts of ethylene glycol and then reesterified with 392 parts of maleic anhydride and 148 parts of phthalic anhydride in the presence of xylene as water entrainer. When no more water is separated 124 parts of ethylene glycol are added slowly and the esterification is continued. The esterification being terminated the xylene and excess ethylene glycol are eliminated under reduced pressure. Thus a colorless, clear resin is obtained which does not flow and which is well soluble in organic solvents. The resin is characterized by an especially low acid number.

*Example 6*

276 parts of glycerol and 267 parts of phenylphosphonous dichloride are reacted at 60° C., the whole is heated for one hour at 120° C. and the pressure is then reduced in order to eliminate the hydrogen chloride formed. 222 parts of phthalic anhydride, 139 parts of fatty acid of linseed oil and 100 parts of xylene are then added and the whole is heated to a temperature of 150–180° C. whereby the esterification takes place, which is perceptible by the separation of water. As soon as the esterification is terminated the xylene is distilled off under reduced pressure at 170–180° C.

After cooling there is obtained a highly viscous, slightly yellow and entirely clear resin which does not flow. It is soluble in many organic solvents such as dioxane, ethylene glycol monoethyl ether, cresol, diacetone alcohol, certain esters, etc. When dissolved in a suitable solvent the resin yields a solution from which a hard, firmly adhering and elastic film having a good flow is obtained on glass or metal after being baked for 10 minutes at 200° C. The films thus produced are incombustible.

*Example 7*

67 parts of phenylphosphonous dichloride are added slowly, drop by drop, while stirring and at a temperature between 50 and 65° C. to 415 parts of a polyester containing hydroxyl groups prepared from 148 parts of phthalic anhydride, 162 parts of ethylene glycol and 123 parts of maleic anhydride. It is necessary simultaneously to cool the mixture. The whole is then heated for one hour, while continuously stirring, to 80° C. The temperature is then increased to 100° C., after 40 minutes to 140° C. and after another 20 minutes to 180° C. while the pressure is simultaneously reduced. A viscous, completely colorless and transparent resin is obtained which does no longer flow and which is well soluble in organic solvents.

When mixing 70 parts of the resin thus obtained with 30 parts of styrene a clear and entirely colorless solution is obtained. Said solution can be hardened at 80° C. in the presence of 0.5% of benzoyl peroxide to yield entirely colorless and water-white shaped bodies which, in addition to a great hardness and good mechanical properties exhibit the advantage that they are difficultly inflammable or self-extinguishing at once when the flame is removed.

*Example 8*

205 parts of styrene-phosphonous dichloride are slowly introduced dropwise at about 60–70° C., while stirring, into a melt of a hydroxyl groups-containing polyester prepared from 372 parts of ethylene glycol, 343 parts of maleic anhydride and 222 parts of phthalic anhydride. When the addition of styrene-phosphonous dichloride is terminated, the temperature is increased to 100° C., after 30 minutes to 120° C. and after further 30 minutes to 140° C. The reaction mixture is then heated for 1 hour to 140° C., the pressure is reduced and the temperature is raised within 1 hour to 180° C. The mixture is then allowed to cool. A highly viscous, slightly yellow resin is obtained which does no longer flow.

60 parts of said resin are mixed at 100° C. with 40 parts of styrene whereby a clear, nearly colorless solution is obtained. The polyester resin thus produced can be polymerized at room temperature in the presence of 1% of methylethyl-ketone peroxide and 0.5% of octadecyl-isocyanate to form a very hard, transparent mass which is completely incombustible.

*Example 9*

In the same manner as described in Example 4 there are condensed 372 parts of ethylene glycol with 154 parts of styrene-phosphonous dichloride. The condensation product is then esterified for 4 hours at 140–180° C. with 392 parts of maleic anhydride and 186 parts of phthalic anhydride in the presence of 50 parts of xylene. The water formed in the course of the reaction is continuously removed from the reaction chamber. At the end of the reaction the pressure is reduced in order to distill off the remaining water and the xylene serving as entrainer. When cooling to room temperature there is obtained a viscous, transparent and colorless resin.

When dissolved in styrene in a ratio of 70:30, said resin yields a clear solution which can be polymerized already at room temperature within 1 hour in the presence of 1% of methylethyl-ketone peroxide to yield a very hard and incombustible mass.

*Example 10*

213 parts of iso-octenyl-phosphonous dichloride are added slowly drop by drop at a temperature in the range between 60 and 70° C. to 847 parts of a hydroxy groups-containing polyester having the same composition as described in Example 8. The temperature is then increased to 100° C., after 30 minutes to 120° C. and after further 30 minutes to 140° C. After having maintained the reaction mixture for 1 hour at 140° C. the pressure is reduced and the temperature is raised within 1 hour to 190° C. After having cooled there is obtained a very viscous, practically colorless resin which does no longer flow.

Said resin is dissolved in styrene in a ratio of 70:30, 10 parts of the resin solution obtained are hardened at room temperature with 0.1 part of methylethyl-ketone peroxide and 0.1 part of octadecyl-isocyanate to yield a very hard, transparent and incombustible mass.

*Example 11*

207 parts of a polyester containing hydroxyl groups prepared as described in Example 10 are reacted as described in said example with 50 parts of phenylphosphonous dibromide. A slightly yellow, very viscous resin is obtained which does not flow and which is well soluble in organic solvents.

10 parts of the resin so obtained admixed at 60° C. with 0.25 part of benzoyl peroxide can be hardened at 100° C. to produce hard, incombustible or self-extinguishing shaped bodies.

*Example 12*

368 parts of a condensate from phenylphosphonous dichloride and ethylene glycol (molar ratio 1:1) are heated together with 134 parts of hexane-triol, 74 parts of butanol and 296 parts of phthalic anhydride. The butanol simultaneously serves as reaction component and as entrainer for the water formed in the course of the esterification. At a final temperature of 180° C. there are drawn off by means of a water separator 26 parts by volume of water in the course of about 17 hours. The reaction product is then heated for 2 hours under reduced pressure. After cooling there is obtained a highly viscous, slightly yellow resin.

*Example 13*

196 parts of terephthalic acid dimethyl ester, 124 parts of ethylene glycol and 1.5 parts of CaO are heated together. When the separation of methanol is terminated the mixture is cooled to 60° C. and 178 parts of phenylphosphonous dichloride are added dropwise at that temperature at a rate depending on the rate of the reaction. The hydrogen chloride set free is eliminated under reduced pressure. The evolution of hydrogen chloride being terminated the product, which has become viscous, is heated under reduced pressure to 150° C. After cooling there is obtained a slightly colored, highly viscous mass which is soluble in organic solvents.

Example 14

92 parts of glycerol and 98 parts of phenylphosphonous acid diethyl ester are heated under nitrogen to 180–190° C. in the presence of 1.5 parts of CaO until the reesterification is terminated. The mixture is then allowed to cool to about 140° C. and 58 parts of fumaric acid are added. The mass obtained is then esterified in the presence of 80 parts of xylene. When the esterification is terminated, the xylene and residues of low molecular constituents are eliminated by heating under reduced pressure. The resin obtained after cooling has a high molecular weight and is soluble in ethylene glycol monoethyl ether. When baked for 10 minutes at 200° C. a solution of this kind yields a hard, clear and incombustible film on glass or metal cups.

Example 15

198 parts of phenylphosphonous acid diethyl ester and 1.0 part of CaO are added at 120° C. to a polyester prepared from 184 parts of glycerol and 148 parts of phthalic anhydride and the whole is heated to 170-180° C. until the reesterification is complete. The resin so obtained yields, when dissolved in a suitable solvent, a hard, elastic and incombustible film on glass and metal after having been baked for 10 minutes at 180° C.

Example 16

10 parts of an unsaturated polyester prepared from 148 parts of phthalic anhydride, 186 parts of ethylene glycol, 147 parts of maleic anhydride and 89 parts of phenylphosphonous dichloride are mixed at 60° C. with 0.25 part of benzoyl peroxide and polymerized at 100° C. A hard yellowish mass is obtained which is very difficult to inflame.

Example 17

2.5 parts of benzoyl peroxide are incorporated at 60° C. into an unsaturated polyester prepared from 45 parts of phenylphosphonous dichloride, 155 parts of ethylene glycol, 111 parts of phthalic anhydride and 147 parts of maleic anhydride. The mass obtained is subsequently polymerized at 100° C. A slightly yellow, hard and difficulty inflammable product is obtained having self-extinguishing properties.

Example 18

70 parts of an unsaturated phosphorus-containing polyester prepared from 296 parts of phthalic anhydride, 325 parts of ethylene glycol, 288 parts of maleic anhydride and 134 parts of phenylphosphonous dichloride are mixed with 30 parts of styrene. A clear and completely colorless solution is obtained having a viscosity of 734 centipoises at 20° C. The solution is polymerized at 70° C. in the presence of 0.5% of benzoyl peroxide. A transparent and entirely colorless mass is produced having good mechanical properties such as ball pressure hardness, flexural strength, tensile strength and impact strength, which is difficultly inflammable or self-extinguishing.

Example 19

A polyester prepared from 111 parts of phthalic anhydride, 155 parts of ethylene glycol, 116 parts of fumaric acid and 135 parts of phenylphosphonous dichloride is mixed with vinyl toluene in a ratio of 70:30. The mixture is then copolymerized in the cold in the presence of 1% of cobalt naphthenate and 2% of methyl-ethyl-ketone peroxide. A completely transparent, very hard mass is obtained which is colored by the addition of cobalt only and which has excellent mechanical properties. The hardened mass is difficultly inflammable or self-extinguishing.

Example 20

An unsaturated polyester prepared from 179 parts of phenylphosphonous dichloride, 212 parts of diethylene glycol and 98 parts of maleic anhydride is dissolved in a ratio of 65:35 in diallyl terephthalate and copolymerized at 70° C. with 1% of benzoyl peroxide. A colorless, transparent and extremely hard mass is obtained which is difficulty inflammable or extinguishes at once when the flame is removed and which possesses good mechanical properties.

Example 21

A polyester prepared from 111 parts of phthalic anhydride, 124 parts of ethylene glycol, 53 parts of diethylene glycol, 116 parts of fumaric acid and 135 parts of phenylphosphonous dichloride is mixed with styrene in a ratio of 70:30 and co-polymerized in the heat at 80° C. in the presence of 0.5% of benzoyl peroxide. A hard, transparent and completely colorless shaped body is obtained having very good mechanical properties. The shaped body is difficulty inflammable and extinguishes at once after being removed from the flame.

We claim:

1. A process for the manufacture of resinous phosphorus-containing polyesters, which comprises reacting at a temperature between about 0° C. and about 200° C. (1) a phosphorus compound of the formula $$RP(X)_2$$

wherein each X is the same radical selected from the group consisting of chlorine, bromine, and oxyalkyl radicals having 1–8 carbon atoms, and wherein R is a radical selected from the group consisting of phenyl, styryl, and alkyl and alkenyl radicals having 2–12 carbon atoms, (2) at least one saturated aliphatic alcohol having at lest two hydroxy groups, and (3) at least one acidic reagent selected from the group consisting of unsubstituted hydrocarbyl dicarboxylic acids having at least one carbon atom between the carboxy groups, and anhydrides, esters, and acid halides of said acids, in amounts such that between 0.7 and 1.25 mols of hydroxy-reactive acidic groups are reacted per mol of hydroxy groups and the mol ratio of the compound $RP(X)_2$ to said acidic reagent is between 1:10 and 10:1.

2. A process as in claim 1 wherein said phosphorus compound $RP(X)_2$ is first reacted with at least a portion of said alcohol to form a reaction product, and said reaction product is then reacted with said acidic reagent and any remaining alcohol.

3. A process as in claim 1 wherein said alcohol and said acidic reagent are first reacted to form a polyester, and said polyester is then reacted with said phosphorus compound $RP(X)_2$. 

4. A process wherein an unsaturated resinous phosphorus-containing polyester is prepared as in claim 1 and is then homopolymerized in the presence of a peroxide catalyst.

5. A process wherein an unsaturated resinous phosphorus-containing polyester is prepared as in claim 1 and is then copolymerized in the presence of a peroxide catalyst with 10–60 percent by weight of a polymerizable monomer selected from the group consisting of vinyl, allyl, and methallyl monomers.

6. A product produced as in claim 1.
7. A product produced as in claim 4.
8. A product produced as in claim 5.
9. A process for the manufacture of resinous phosphorus-containing polyesters, which comprises reacting about equal amounts by weight of glycerol and phenyl phosphonous dichloride at a temperature in the range between 60 and 120° C., removing the formed hydrogen chloride in vacuo, adding a mixture of phthalic anhydride, fatty acid of linseed oil, and xylene, heating at a temperature in the range between 150 and 180° C. and distilling off the xylene and the water formed.

10. A process for the manufacture of resinous phosphorus-containing polyesters, which comprises reacting a polyester resin obtained by reacting one part by weight of phthalic anhydride, 0.6–1.2 parts by weight of maleic anhydride and 1–1.5 parts by weight of ethylene glycol with 0.2–0.8 part by weight of phenyl phosphonous dichloride at a temperature in the range between 50 and 180° C., removing the formed hydrogen chloride in vacuo and polymerizing the thus obtained unsaturated polyester by means of 0.1–1% of dibenzoyl peroxide at a temperature in the range between 50 and 120° C.

11. A process for the manufacture of resinous phosphorus-containing polyesters, which comprises reacting a polyester resin obtained by reacting one part by weight of phthalic anhydride, 0.6–1.2 parts by weight of maleic anhydride and 1–1.5 parts by weight of ethylene glycol with 0.2–0.8 part by weight of phenyl phosphonous dichloride at a temperature in the range between 50 and 180° C. removing the formed hydrogen chloride in vacuo and copolymerizing one part by weight of the thus obtained unsaturated polyester with 0.1 to 1.5 parts by weight of at least one polymerizable monomer selected from the group consisting of vinyl, allyl, and methallyl monomers by means of 0.1–1% dibenzoyl peroxide at a temperature in the range between 50 and 120° C.

References Cited in the file of this patent

UNITED STATES PATENTS

| | | |
|---|---|---|
| 2,382,622 | Fon Toy | Aug. 14, 1945 |
| 2,435,252 | Fon Toy | Feb. 3, 1948 |
| 2,722,538 | Jackson | Nov. 1, 1955 |